Inventor
MARTINUS DEN HERTOG
By Robert Harding Jr.
Attorney

Sept. 4, 1956 M. DEN HERTOG 2,761,903

ELECTRICAL COMMUNICATION SYSTEMS

Filed Jan. 13, 1951 7 Sheets-Sheet 2

Inventor
MARTINUS DEN HERTOG

By
Attorney

| DIRECTION NUMBER | SOURCES USED Pd Rd | SOURCES USED Pe Re | TIME UNIT NUMBER MULTIPLES OF 33 PLUS |
|---|---|---|---|
| 1 | 1 | 1 | 1 |
| 2 | 2 | 2 | 2 |
| 3 | 3 | 3 | 3 |
| 4 | 4 | 1 | 4 |
| 5 | 5 | 2 | 5 |
| 6 | 6 | 3 | 6 |
| 7 | 7 | 1 | 7 |
| 8 | 8 | 2 | 8 |
| 9 | 9 | 3 | 9 |
| 10 | 10 | 1 | 10 |
| 11 | 11 | 2 | 11 |
| 12 | 1 | 3 | 12 |
| 13 | 2 | 1 | 13 |
| 14 | 3 | 2 | 14 |
| 15 | 4 | 3 | 15 |
| 16 | 5 | 1 | 16 |
| 17 | 6 | 2 | 17 |
| 18 | 7 | 3 | 18 |
| 19 | 8 | 1 | 19 |
| 20 | 9 | 2 | 20 |
| 21 | 10 | 3 | 21 |
| 22 | 11 | 1 | 22 |
| 23 | 1 | 2 | 23 |
| 24 | 2 | 3 | 24 |
| 25 | 3 | 1 | 25 |
| 26 | 4 | 2 | 26 |
| 27 | 5 | 3 | 27 |
| 28 | 6 | 1 | 28 |
| 29 | 7 | 2 | 29 |
| 30 | 8 | 3 | 30 |
| 31 | 9 | 1 | 31 |
| 32 | 10 | 2 | 32 |
| 33 | 11 | 3 | 33 |

Inventor
MARTINUS DEN HERTOG
By Robert Harding Jr.
Attorney

FIG. 4.

| REGISTER NUMBER | SOURCES USED | | | TIME UNIT NUMBER: | REG. Nº OR TIME UNIT | SOURCES USED | | | TIME UNIT NUMBER: |
|---|---|---|---|---|---|---|---|---|---|
| | $P_a$ | $P_b$ | $P_c$ | MULTIPLES OF 100 PLUS: | | $P_a$ | $P_b$ | $P_c$ | MULTIPLES OF 100 PLUS: |
| 1 | 1 | 1 | 1 | 1 | 51 | 1 | 1 | 3 | 51 |
| 2 | 2 | 1 | 2 | 2 | 52 | 2 | 1 | 4 | 52 |
| 3 | 3 | 1 | 3 | 3 | 53 | 3 | 1 | 1 | 53 |
| 4 | 4 | 1 | 4 | 4 | 54 | 4 | 1 | 2 | 54 |
| 5 | 5 | 1 | 1 | 5 | 55 | 5 | 1 | 3 | 55 |
| 6 | 1 | 2 | 2 | 6 | 56 | 1 | 2 | 4 | 56 |
| 7 | 2 | 2 | 3 | 7 | 57 | 2 | 2 | 1 | 57 |
| 8 | 3 | 2 | 4 | 8 | 58 | 3 | 2 | 2 | 58 |
| 9 | 4 | 2 | 1 | 9 | 59 | 4 | 2 | 3 | 59 |
| 10 | 5 | 2 | 2 | 10 | 60 | 5 | 2 | 4 | 60 |
| 11 | 1 | 3 | 3 | 11 | 61 | 1 | 3 | 1 | 61 |
| 12 | 2 | 3 | 4 | 12 | 62 | 2 | 3 | 2 | 62 |
| 13 | 3 | 3 | 1 | 13 | 63 | 3 | 3 | 3 | 63 |
| 14 | 4 | 3 | 2 | 14 | 64 | 4 | 3 | 4 | 64 |
| 15 | 5 | 3 | 3 | 15 | 65 | 5 | 3 | 1 | 65 |
| 16 | 1 | 4 | 4 | 16 | 66 | 1 | 4 | 2 | 66 |
| 17 | 2 | 4 | 1 | 17 | 67 | 2 | 4 | 3 | 67 |
| 18 | 3 | 4 | 2 | 18 | 68 | 3 | 4 | 4 | 68 |
| 19 | 4 | 4 | 3 | 19 | 69 | 4 | 4 | 1 | 69 |
| 20 | 5 | 4 | 4 | 20 | 70 | 5 | 4 | 2 | 70 |
| 21 | 1 | 5 | 1 | 21 | 71 | 1 | 5 | 3 | 71 |
| 22 | 2 | 5 | 2 | 22 | 72 | 2 | 5 | 4 | 72 |
| 23 | 3 | 5 | 3 | 23 | 73 | 3 | 5 | 1 | 73 |
| 24 | 4 | 5 | 4 | 24 | 74 | 4 | 5 | 2 | 74 |
| 25 | 5 | 5 | 1 | 25 | 75 | 5 | 5 | 3 | 75 |
| 26 | 1 | 1 | 2 | 26 | 76 | 1 | 1 | 4 | 76 |
| 27 | 2 | 1 | 3 | 27 | 77 | 2 | 1 | 1 | 77 |
| 28 | 3 | 1 | 4 | 28 | 78 | 3 | 1 | 2 | 78 |
| 29 | 4 | 1 | 1 | 29 | 79 | 4 | 1 | 3 | 79 |
| 30 | 5 | 1 | 2 | 30 | 80 | 5 | 1 | 4 | 80 |
| 31 | 1 | 2 | 3 | 31 | 81 | 1 | 2 | 1 | 81 |
| 32 | 2 | 2 | 4 | 32 | 82 | 2 | 2 | 2 | 82 |
| 33 | 3 | 2 | 1 | 33 | 83 | 3 | 2 | 3 | 83 |
| 34 | 4 | 2 | 2 | 34 | 84 | 4 | 2 | 4 | 84 |
| 35 | 5 | 2 | 3 | 35 | 85 | 5 | 2 | 1 | 85 |
| 36 | 1 | 3 | 4 | 36 | 86 | 1 | 3 | 2 | 86 |
| 37 | 2 | 3 | 1 | 37 | 87 | 2 | 3 | 3 | 87 |
| 38 | 3 | 3 | 2 | 38 | 88 | 3 | 3 | 4 | 88 |
| 39 | 4 | 3 | 3 | 39 | 89 | 4 | 3 | 1 | 89 |
| 40 | 5 | 3 | 4 | 40 | 90 | 5 | 3 | 2 | 90 |
| 41 | 1 | 4 | 1 | 41 | 91 | 1 | 4 | 3 | 91 |
| 42 | 2 | 4 | 2 | 42 | 92 | 2 | 4 | 4 | 92 |
| 43 | 3 | 4 | 3 | 43 | 93 | 3 | 4 | 1 | 93 |
| 44 | 4 | 4 | 4 | 44 | 94 | 4 | 4 | 2 | 94 |
| 45 | 5 | 4 | 1 | 45 | 95 | 5 | 4 | 3 | 95 |
| 46 | 1 | 5 | 2 | 46 | 96 | 1 | 5 | 4 | 96 |
| 47 | 2 | 5 | 3 | 47 | 97 | 2 | 5 | 1 | 97 |
| 48 | 3 | 5 | 4 | 48 | 98 | 3 | 5 | 2 | 98 |
| 49 | 4 | 5 | 1 | 49 | 99 | 4 | 5 | 3 | 99 |
| 50 | 5 | 5 | 2 | 50 | 100 | 5 | 5 | 4 | 100 |

Inventor
MARTINUS DEN HERTOG
By Robert Harding Jr.
Attorney

FIG. 6.

| REG. | DIRECTION NUMBER | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Nº | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| 1 | 1 | 101 | 201 | 301 | 401 | 501 | 601 | 701 | 801 | 901 | 1001 | 1101 | 1201 | 1301 | 1401 | 1501 | 1601 | 1701 | 1801 | 1901 | 2001 | 2101 | 2201 | 2301 | 2401 | 2501 | 2601 | 2701 | 2801 | 2901 | 3001 | 3101 | 3201 |
| 2 | 3202 | 2 | | | | | | | | | | | | | | | | | | | | | | | | | | | | | | | |
| 3 | 3103 | | 3 | | | | | | | | | | | | | | | | | | | | | | | | | | | | | | |
| 4 | 3004 | | | 4 | | | | | | | | | | | | | | | | | | | | | | | | | | | | | |
| 5 | 2905 | | | | 5 | | | | | | | | | | | | | | | | | | | | | | | | | | | | |
| 6 | 2806 | | | | | 6 | | | | | | | | | | | | | | | | | | | | | | | | | | | |
| 7 | 2707 | | | | | | 7 | | | | | | | | | | | | | | | | | | | | | | | | | | |
| 8 | 2608 | | | | | | | 8 | | | | | | | | | | | | | | | | | | | | | | | | | |
| 9 | 2509 | | | | | | | | 9 | | | | | | | | | | | | | | | | | | | | | | | | |
| 10 | 2410 | 2510 | 2610 | 2710 | 2810 | 2910 | 3010 | 3110 | 3210 | 10 | 110 | 210 | 310 | 410 | 510 | 610 | 710 | 810 | 910 | 1010 | 1110 | 1210 | 1310 | 1410 | 1510 | 1610 | 1710 | 1810 | 1910 | 2010 | 2110 | 2210 | 2310 |
| 11 | 2311 | | | | | | | | | | 11 | | | | | | | | | | | | | | | | | | | | | | |
| 12 | 2212 | | | | | | | | | | | 12 | | | | | | | | | | | | | | | | | | | | | |
| 13 | 2113 | | | | | | | | | | | | 13 | | | | | | | | | | | | | | | | | | | | |
| 14 | 2014 | | | | | | | | | | | | | 14 | | | | | | | | | | | | | | | | | | | |
| 15 | 1915 | | | | | | | | | | | | | | 15 | | | | | | | | | | | | | | | | | | |
| 16 | 1816 | | | | | | | | | | | | | | | 16 | | | | | | | | | | | | | | | | | |
| 17 | 1717 | | | | | | | | | | | | | | | | 17 | | | | | | | | | | | | | | | | |
| 18 | 1618 | | | | | | | | | | | | | | | | | 18 | | | | | | | | | | | | | | | |
| 19 | 1519 | | | | | | | | | | | | | | | | | | 19 | | | | | | | | | | | | | | |
| 20 | 1420 | 1520 | 1620 | 1720 | 1820 | 1920 | 2020 | 2120 | 2220 | 2320 | 2420 | 2520 | 2620 | 2720 | 2820 | 2920 | 3020 | 3120 | 3220 | 20 | 120 | 220 | 320 | 420 | 520 | 620 | 720 | 820 | 920 | 1020 | 1120 | 1220 | 1320 |
| 21 | 1321 | | | | | | | | | | | | | | | | | | | | 21 | | | | | | | | | | | | |
| 22 | 1222 | | | | | | | | | | | | | | | | | | | | | 22 | | | | | | | | | | | |
| 23 | 1123 | | | | | | | | | | | | | | | | | | | | | | 23 | | | | | | | | | | |
| 24 | 1024 | | | | | | | | | | | | | | | | | | | | | | | 24 | | | | | | | | | |
| 25 | 925 | 1025 | 1125 | 1225 | 1325 | 1425 | 1525 | 1625 | 1725 | 1825 | 1925 | 2025 | 2125 | 2225 | 2325 | 2425 | 2525 | 2625 | 2725 | 2825 | 2925 | 3025 | 3125 | 3225 | 25 | 125 | 225 | 325 | 425 | 525 | 625 | 725 | 825 |
| 26 | 826 | | | | | | | | | | | | | | | | | | | | | | | | | 26 | | | | | | | |
| 27 | 727 | | | | | | | | | | | | | | | | | | | | | | | | | | 27 | | | | | | |
| 28 | 628 | | | | | | | | | | | | | | | | | | | | | | | | | | | 28 | | | | | |
| 29 | 529 | | | | | | | | | | | | | | | | | | | | | | | | | | | | 29 | | | | |
| 30 | 430 | 530 | 630 | 730 | 830 | 930 | 1030 | 1130 | 1230 | 1330 | 1430 | 1530 | 1630 | 1730 | 1830 | 1930 | 2030 | 2130 | 2230 | 2330 | 2430 | 2530 | 2630 | 2730 | 2830 | 2930 | 3030 | 3130 | 3230 | 30 | 130 | 230 | 330 |
| 31 | 331 | | | | | | | | | | | | | | | | | | | | | | | | | | | | | | 31 | | |
| 32 | 232 | | | | | | | | | | | | | | | | | | | | | | | | | | | | | | | 32 | |
| 33 | 133 | | | | | | | | | | | | | | | | | | | | | | | | | | | | | | | | 33 |
| 34 | 34 | | | | | | | | | | | | | | | | | | | | | | | | | | | | | | | | |
| 35 | 3235 | 35 | | | | | | | | | | | | | | | | | | | | | | | | | | | | | | | |

Inventor
MARTINUS DEN HERTOG
By [signature]
Attorney

Sept. 4, 1956 M. DEN HERTOG 2,761,903
ELECTRICAL COMMUNICATION SYSTEMS
Filed Jan. 13, 1951 7 Sheets-Sheet 6

Inventor
MARTINUS DEN HERTOG
By Robert Harding Jr.
Attorney

Inventor
MARTINUS DEN HERTOG
By Robert Harding Jr.
Attorney

United States Patent Office 2,761,903

Patented Sept. 4, 1956

2,761,903

ELECTRICAL COMMUNICATION SYSTEMS

Martinus Den Hertog, Antwerp, Belgium, assignor to International Standard Electric Corporation, New York, N. Y., a corporation of Delaware Application January 13, 1951, Serial No. 205,914

Claims priority, application Great Britain January 16, 1950

13 Claims. (Cl. 179—18)

This invention relates to electrical equipment for translating information from one basis to another.

One feature of the invention comprises electrical equipment for translating information from one basis to another and which is arranged to perform translations on a pulse-time basis.

Another feature of the invention comprises an electronic translating means associated, or for association, in common with a number of equipments requiring translations to be made.

Another feature of the invention comprises a translating means which is associated, or is capable of association, with a number of equipments requiring translations to be made, and which is arranged to perform translations on a pulse-time basis.

A further feature of the invention comprises a translating means which is associated, or is capable of association, with a number of equipments requiring translations to be made, and which is arranged to perform translations for different equipments in time positions unique to the respective equipments.

Yet another feature of the invention comprises electrical signal equipment arranged to signal information to a number of signal receiving equipments characterised by signalling equipment for signalling by pulses in different positions in a repetitive cycle of time positions each position of which characterises a particular piece of information and the signal receiving equipment for which it is intended.

Another feature of the invention comprises electrical signal equipment arranged to signal information from a number of signal transmitting equipments to a signal receiving equipment characterised by signalling equipment for signalling by pulses in different positions in a repetitive cycle of time positions each position of which characterises the signal transmitting equipment for which the signal is sent.

Other features will be apparent from the following description of the invention with particular reference to common cross-connecting equipment for a number of register-controllers in an automatic telephone exchange using crossbar multi-switches and static pulse-time selection-control, as described in the applications, Serial No. 171,-341, filed June 30, 1950, and Serial No. 175,704, filed June 25, 1950, which correspond respectively to German Patent No. 853,302 of October 23, 1952, and Belgian Patent No. 497,403 of August 31, 1950.

The use of such a common cross-connecting equipment, or translator may be most simply explained by considering a telephone exchange area in which there are approximately 50 exchanges which are distinguished by a 2-figure exchange prefix. As each of these exchanges has a 10,000 line capacity, 4 further numericals are required to make up a total of the 6-digit subscriber number.

Let us imagine that there are direct lines from any exchange to a maximum of 20 other automatic exchanges and to a manual exchange reached by the single digit "0." The remaining automatic exchanges will be reached through one common transit exchange.

It will be seen that the total number of directions to be selected on the first selecting stages at each automatic exchange is as follows: one to local exchange, one to manual main exchange, one to transit exchange, and twenty to automatic exchanges making a total of twenty-three directions in all.

The purpose of the translator is to give a route indication.

It should be observed that all distant exchanges which are routed via the transit exchange are reached by the same direction, viz that of the transit exchange, so that the total number of directions to be indicated is only 23.

After the exchange prefix has been received from a calling party by a register controller, the routing indication is obtained from the common translator and according to this indication the required direction is selected. A selection will be made from a total of 23 directions by a single group marking. This is due to the fact that use is made of 2-step selecting stages as described in applications, Serial No. 778,657, filed October 8, 1947 and Serial No. 188,932, filed October 7, 1950, corresponding respectively to British Patent No. 653,524 of August 29, 1951, and Belgian Patent No. 498,523 of October 31, 1950, for selecting the required directions. Owing to the large number of junctions which may be reached via a 2-step selecting stage, these may be divided into a large number of different groups and yet ensure full availability. According to the direction indicated by the route indication, therefore, the register will immediately mark one out of 23 groups of junctions and by this single marking, control the selection on the two consecutive steps of the 2-step selecting stage. In some cases when very large traffific quantities are involved, it may be necessary to precede the 2-step selecting stage by a first selecting stage on which the selection is also determined by the route indication.

When a junction to the required direction has been selected, the following cases may be distinguished:

*Local calls.*—The class of line indication obtained from the local junction in the manner described in application, Serial No. 175,704, filed June 25, 1950, corresponding to Belgian Patent No. 497,403 of August 31, 1950, tells the register to proceed with the 1000's selection by time pulsing methods.

*Call to distant exchange via direction junction.*—The class of line indication received from an outgoing junction tells the register to change its function for distant operation, and, as the result of the routing indication received, the register will proceed with transferring to a terminating register at the distant exchange the value of the 4 last numerals of the subscriber number. These four figures are used by this terminating register to control the selection at the distant exchange of one of the 10,000 subscribers connected thereto.

*Connection to a distant exchange via the transit exchange.*—The class of line indication obtained from the outgoing junctions circuit tells the register to change its function for distant operation, but owing to the fact that the route indication indicates the transit exchange, the register, will now transfer the two figures of the exchange prefix to a transit register associated with the transit equipment at a transit exchange, without following this up by the remaining digits.

The transit register, by receiving the exchange prefix, will, in a similar manner, as described for the originating register, call in the assistance of a common translator circuit to obtain a route indication according to the prefix received, and by this route indication one of the directions is immediately indicated. The exchange prefix may contain either one or two digits, but these digits are not used as such to control a selection, but they are translated into a number of equivalent indications each marking directly one particular group. This is similar to what happened in the originating exchange, the difference being only that at the transit exchange it may be necessary to arrange the translator for more than 23 directions. Thus again at the transit exchange the selection is completed via a 2-step selecting stage on which the required group is immediately selected by a single group marking, viz, one of the different directions that may be obtained via the transit exchange. After the transit register has found a free junction in the required group, it disconnects itself and brings the equipment at the transit exchange into the conversational condition. By the use of V. F. or voice-frequency impulsing for the transfer of the numerical indications, it now becomes possible to mutually control the registers at the originating and the terminating exchange via the transit equipment, without this equipment taking an active part in these operations. This means that as soon as the transit register is disconnected, the terminating register may signal immediately to the originating register to proceed with sending the remaining four figures which are then transmitted directly via the transit equipment from the originating to the terminating register, in the same way as if these two exchanges were interconnected directly.

From the above it will be seen that a large number of digital combinations, e. g. about one hundred, will be translated into a smaller number of route indications, e. g. twenty or thirty, because all those exchanges which are handled via the same transit exchange, will make use of the same route indication. The number assigned to these route indications is not a real numerical value by means of which selections are controlled; the route indications might equally well have been denominated by letters, for example, but as described some of these route indications have a single digit and others two.

The cross-connecting or translating arrangement will now be described with reference to the accompanying drawings in which:

Fig. 1 shows the common cross-connecting or translating equipment and those portions of a register controller which interwork with the common cross-connecting or translating equipment. The common translator is capable of handling one hundred register-controllers, and of translating one hundred two-figure combinations into up to thirty-three directions.

Fig. 2 shows in detail one possible rectifier cross-connecting network arrangement for inter-connecting the sixteen leads X1 . . . X6, Y1 . . . Y6, X'1 . . . X'6, Y'1 . . . Y'6, Fig. 1, to the ten sets of leads A0 . . . 9, B0 . . . 9, Fig. 1.

Fig. 4 is a table illustrating how the pulse cycles P*a*, P*b*, P*c*, Fig. 3, are allocated among the register controllers to give each an individual time position in an overall cycle of one hundred time positions for using the common translator.

Fig. 3, are allocated among the directions (local and outgoing) to give each an individual time position in an overall cycle of thirty-three time positions.

Fig. 6 is a table illustrating how time positions in a time cycle of 3300 time positions, derived from the time cycles P*a*, P*b*, P*c*, P*d*, P*e*, are allocated thirty-three to each register in its own individual time positions of the P*a*, P*b*, P*c* hundred-position cycle, so that during a translation, a register will receive from the common translator a pulse indicating the direction to be seized in one of thirty-three successive appearances of its own time positions in the hundreds cycle used for identifying the register controllers.

Figure 1:
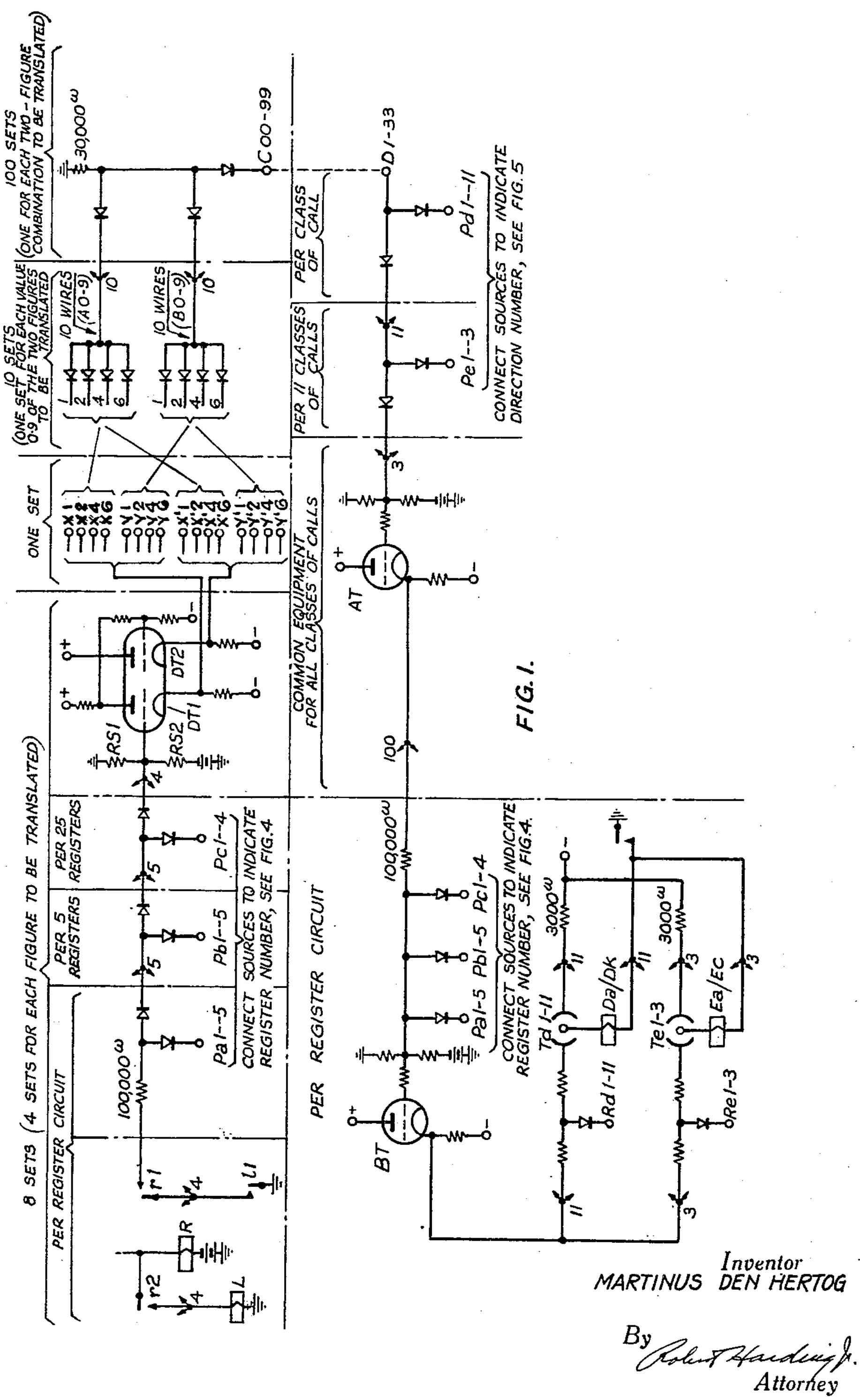
Figure 7:
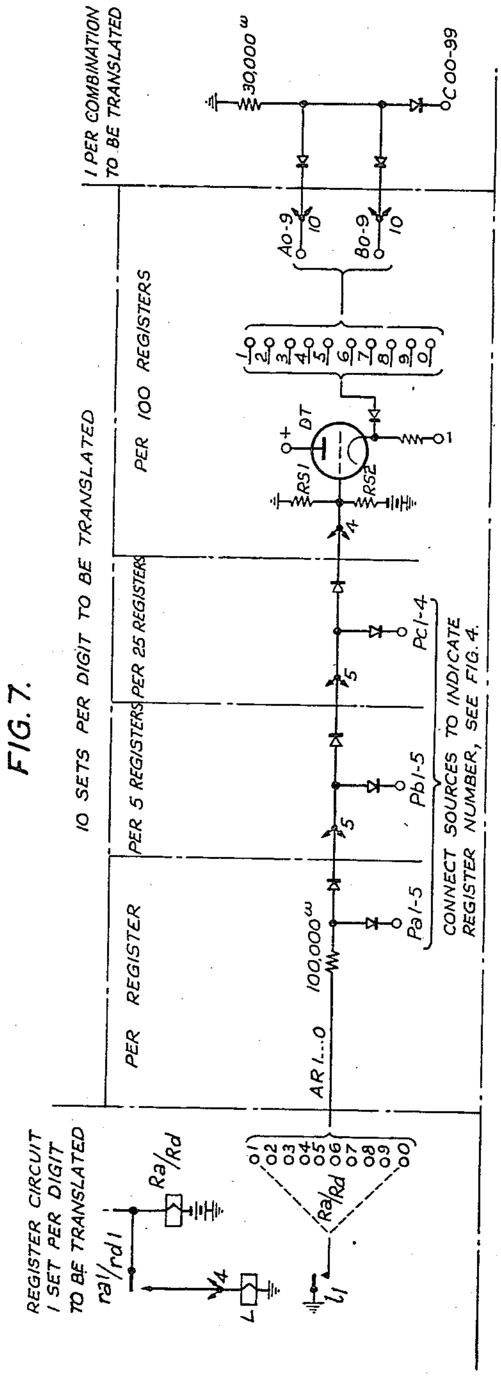
Figures 8, 9:
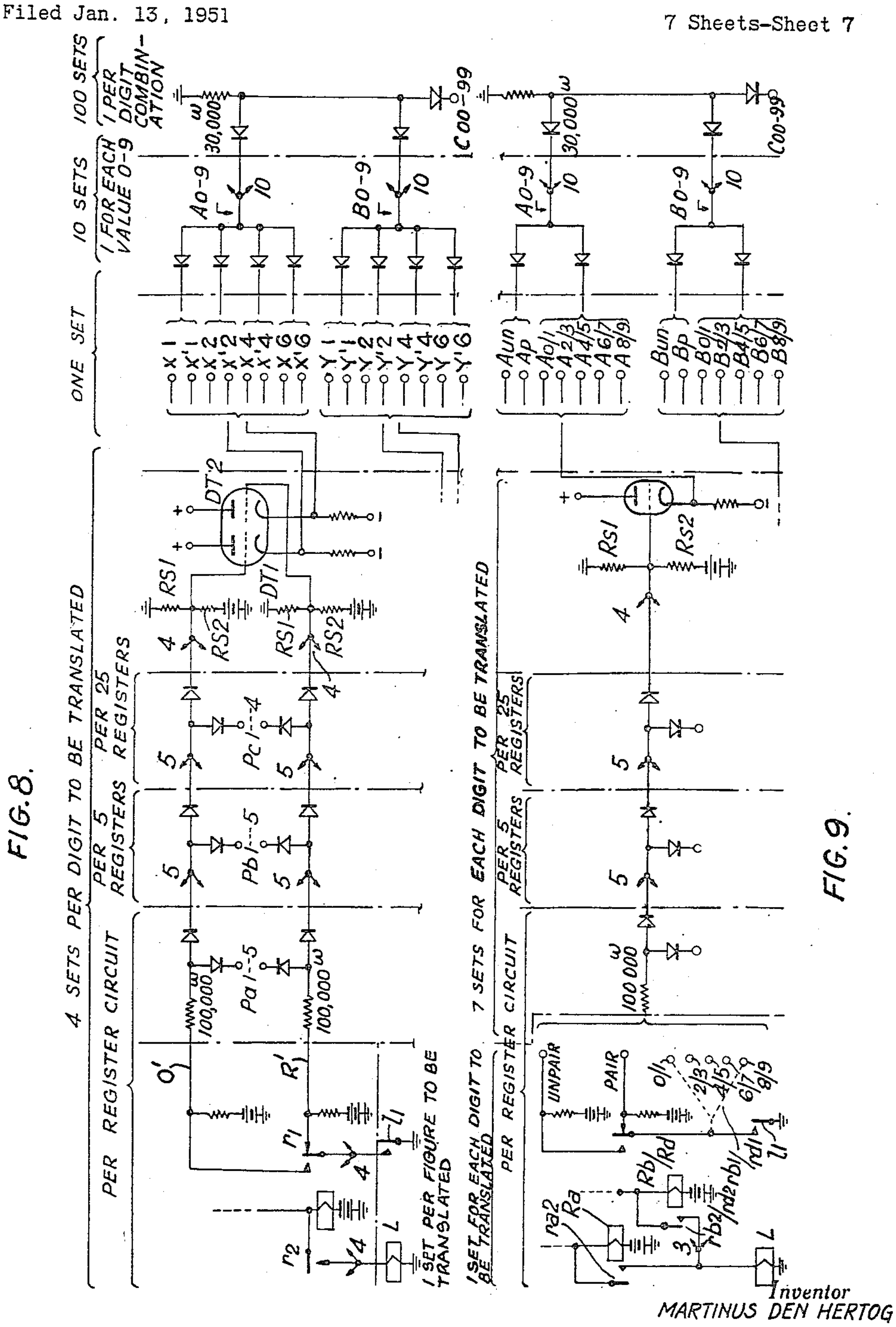

Figs. 7, 8 and 9 show arrangements for signalling from the register-controllers to the common translator alternative to that shown in Fig. 1.

The drawings illustrate the manner in which, by means of time pulse methods, translation is effected of a variable number of figures for a large number of registers, by means of a common translator circuit. By way of example, the drawings show an arrangement in which one common translator is provided for 100 registers and for which any one of 100 two-figure combinations for each register may be translated into any one of 33 different class-of-call indications for any number of registers in a simultaneous manner.

The arrangement is characterised by the following features:

Use of time pulse method of effecting translation.

Translation is effected by means of one common translator for a large number of registers, so that the necessary translation to be provided for certain number combinations received at these registers may be effected by means of a single jumpering field.

All registers for which the common translator is provided may call for a translation operation at the same time and for each of these registers this translation will be produced in a particular time position which is characteristic for this register.

The number of figures to be translated may be made variable, so that for instance, some combinations to be translated will comprise more figures than others. In such a case the translator will return a translation to a register calling for translation, only when the register has received all figures which are needed for the translation in question.

When the number of figures to be translated is different for different combinations, the register does not need to determine the number of figures comprised in each combination to be translated. It will simply connect the code for each figure, which may be involved in translation, to the common translator; as soon as the translator receives from a particular register the indications for a sufficient number of figures to permit it to translate this combination, it will return to the register the required translation, which thereby causes the register to stop calling for the translation.

The translation happens by means of purely static apparatus.

Fig. 1 shows in the left-hand top corner a recording relay R with two of its contacts, *r*1 and *r*2. It is assumed that, for each figure to be recorded, a register will comprise four of these relays R, which operate in a predetermined code to indicate one of ten different numerical values. The binary code may be used, but in the drawing it has been assumed that the code in which the figures are registered is the so-called 1-2-4-6 code, i. e., each of the four relays represents one of the values 1-2-4-6 and the four relays of a set operate in a combination such that the sum of the values of the operated relays equals the value of a decimal figure to be registered.

It is, however, possible to use any other different method of recording figures on four or more relays.

It is assumed on the drawing that 100 combinations of two figures have to be translated. For recording these two figures at the register, each register is provided with two sets each of four relays of which a single one R has been shown on the drawing.

When one or more of the relays of a set are operated and their operating circuit is subsequently opened, they provide a locking circuit for themselves in series with one of their own make contacts *r*2 and the winding of a relay L, which one is also indicated. It is assumed that one relay L is provided for each set of four relays recording a figure, and that when operated, this relay provides a ground at a contact *l*1 to the four make contacts *r*1 of the corresponding set of four relays R.

It is assumed that the first figure to be translated is called the "A" figure and the second figure the "B" figure. For each of the eight recording relays of these two figures, one wire will be taken from each register individually to a resistance of 100,000 ohms forming part of the translator circuit. It will be clear from the above that if the two figures "A" and "B" to be registered constitute e. g. combination "25," ground will be present on three of the eight wires leading from the register concerned to the translating equipment, viz. a ground on wire "2" of set A and a ground on wires "1" and "4" of set B of this register.

Assuming that in an exchange 100 registers would be equipped, there would be 100 sets of eight wires as explained above, and these 100 sets of wires are so connected to the translator equipment that eight groups each of 100 similar wires are formed, i. e. the 100 wires "1" of set A constitute one group, the 100 wires "2" of set A a second group, and so on. The 100 wires of each of the eight groups are connected to a static exploring circuit with 100 input wires, such as described in U. S. Patent No. 2,563,589, there being, therefore, a total of eight of these exploring circuits, of which one has been represented in Fig. 1.

Figures 3, 5:
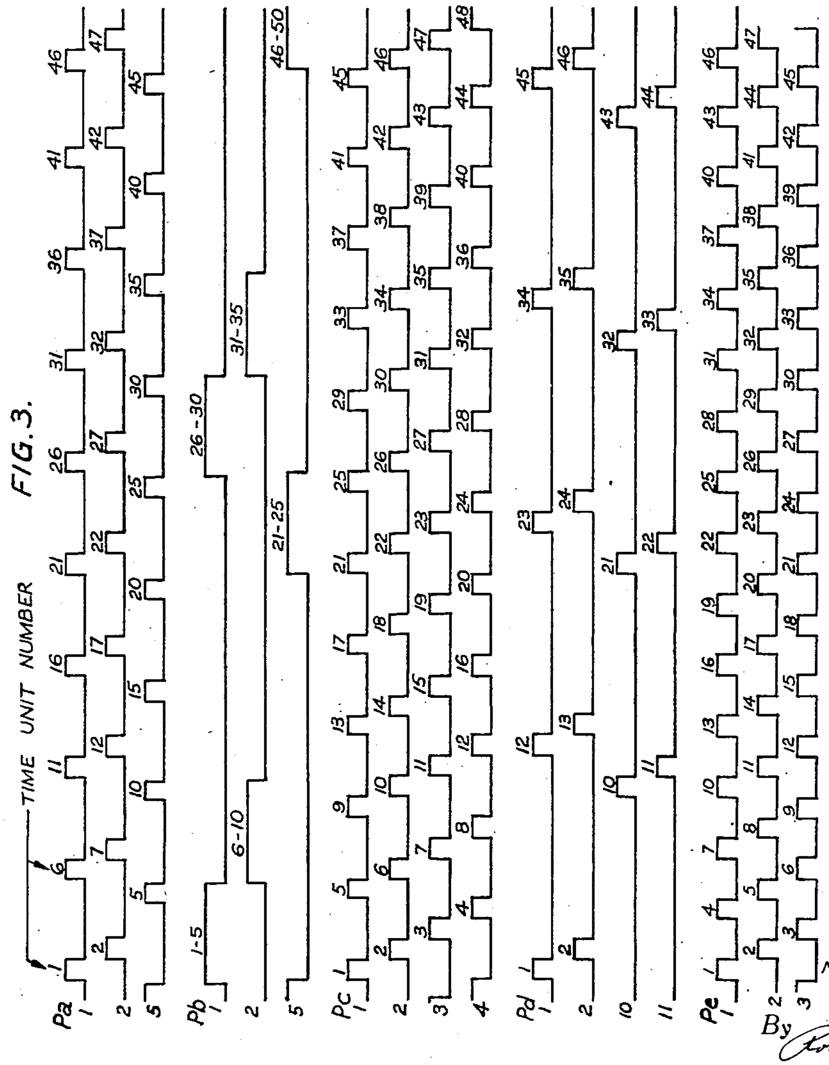
Fig. 3 represents the time pulse cycles from sources used for inter-connecting the register controllers and the common translator.
Fig. 5 is a table illustrating how the pulse cycles P*d*, P*e*.

The exploring circuits are controlled by impulses P*a*1–5, P*b*1–5 and P*c*1–4 which have the shape and time relationship indicated in Fig. 3 and are produced by sources which for convenience are referred to by the same reference characters. By means of different combinations of these sources an impulse may be transmitted in a specific time from each of the 100 resistances provided for each of the exploring circuits, to the grid circuit of a tube DT1. The eight leads from each register will have the same specific time in each one of the corresponding eight exploring circuits, and this time may, for instance, be identified as being equal to the register number. This may be obtained by connecting the leads from the registers to those points of the explorer circuits, which provide the desired time unit, e. g. the eight leads from the register No. 1 will be connected to that point of each of the eight explorer circuits which is controlled by sources P*a*1, P*b*1 and P*c*1, which together cause an impulse to be given in time unit No. 1, as shown in Fig. 4, in which the relation between the sources connected and the corresponding time units in which an impulse is transmitted for the 100 points of each explorer circuit is shown.

Each of the eight explorers terminates in the grid lead of one of eight double triodes DT1, DT2 of which again one only has been indicated on the drawing. The grid of the left-hand triode DT1 is normally held at a relatively negative potential by means of a potentiometer comprising resistances RS1 and RS2. Assuming that a ground is connected via contact *l*1 of one of the recording relays, this ground will be transmitted only in the time unit corresponding to the register concerned, via the 100,000 ohm resistance to the grid circuit of the left-hand triode DT1 corresponding to this recording relay, and will make the grid potential relatively positive.

The triode DT1 is connected as a cathode follower, so that the output leads which are connected to the cathodes of each of these tubes, are also normally relatively negative and will assume a relatively positive potential when a positive impulse is transmitted to the grid. The eight output leads from the eight triodes DT1 are shown separately on the drawing and are denominated X1, X2, X4 and X6 for the four tubes corresponding to the 100×4 leads from the registers on which the value of the digital number "A" may be transmitted, whereas the denomination is Y1, Y2, Y4 and Y6, for those four tubes corresponding to the 100×4 leads from the registers on which the digital number "B" may be transmitted.

The grid of the triode DT2 of each double triode is connected to a potentiometer, part of which is constituted by the resistance in the anode circuit of the associated triode DT1. In the normal condition of the circuit, when no positive impulses are received on the grid of the left-hand triode DT1, the grid circuit of the right-hand triode will be relatively positive. When, however, the left-hand triode DT1 receives an impulse, the current in its anode circuit increases, owing to which the grid of the right-hand triode DT2 assumes a more negative potential.

From the above it will be clear that the grid of the right-hand triode DT2 will be relatively positive normally, but will become relatively negative when a positive impulse is received on the grid of the corresponding left-hand triode DT1.

Each of the triodes DT2 is also connected as a cathode follower and the output leads from the cathodes of these tubes will, therefore, substantially follow the potential of the grid, so that on these output leads a relatively negative impulse will result from the receipt of a relatively positive impulse on the grid of the corresponding triode DT1.

The eight wires from the cathodes of the eight triodes DT2 are also indicated separately on the drawing and are denominated X'1, X'2, X'4 and X'6 for those four tubes controlling the 100 sets of four wires from the registers on which the value of digital number "A" is transmitted, and their denomination is Y'1, Y'2, Y'4 and Y'6 for those four tubes which are controlled by the 100×4 wires from the registers on which the digital number "B" is transmitted.

In the example given above in which combination "25" was received at register No. 1, it will now be clear that as a result of this, during time unit No. 1, wires X2, Y1 and Y4 will assume a relatively positive potential, whereas wires X2, Y1 and Y'4 will assume a relatively negative potential. Further, wires X1, X4 and X6, and Y2, Y6 will remain relatively negative and wires X'1, X'4 and X'6, and Y'2 and Y'6 will remain relatively positive.

Figure 2:
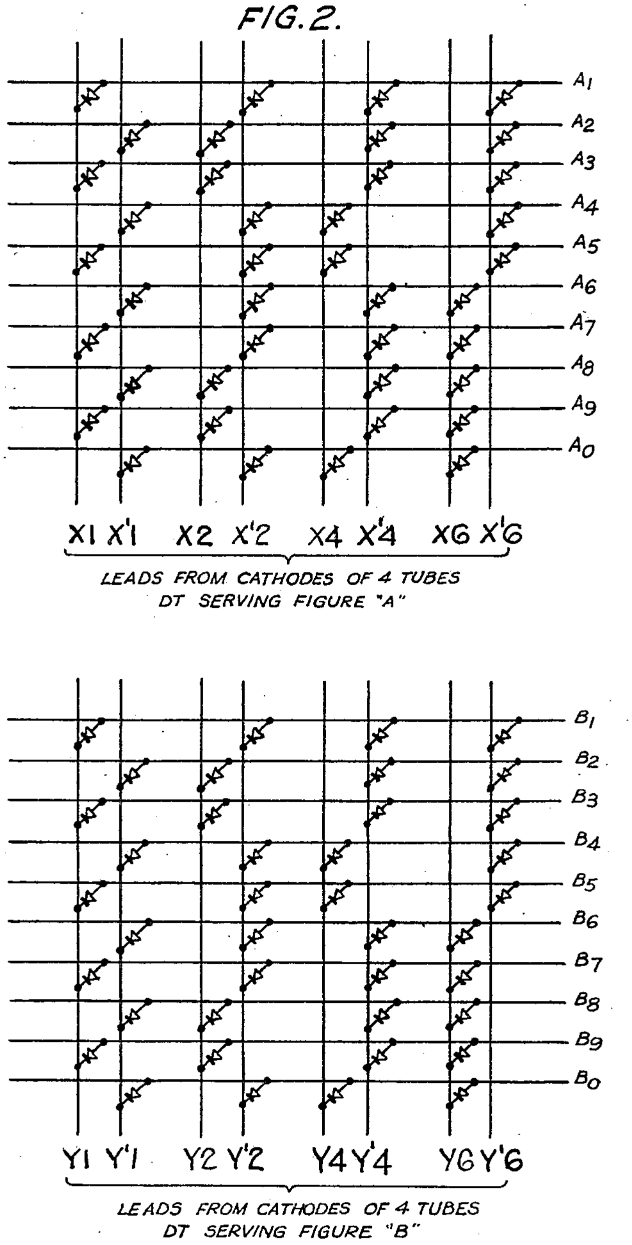

The two groups of eight wires from the cathode circuits of the double triodes are again represented by the same denomination in Fig. 2 which shows in which manner these 16 wires are interconnected with two groups each of ten leads denominated A0 . . . 9 and B0 . . . 9.

It will be seen that each of these 20 wires is associated with four rectifiers which in different combinations are connected to the 16 cathode leads. These connections have been indicated diagrammatically in Fig. 1. A coded numercial record electrically applied to the X1 . . . 6 and Y1 . . . 6, X'1 . . . 6 and Y'1 . . . 6 leads is translated by the rectifier network into a decimal indication.

It will now be explained what is the function of the 20 wires A1 . . . 0, B1 . . . 0.

Fig. 1 in its right-hand top corner shows a resistance of 30,000 ohms connected to ground. This resistance is one of 100 resistances, each of which is provided for one of the 100 different combinations which may be constituted by numerical figures "A" and "B" and each resistance therefore bears a number corresponding to the associated combination.

Each of these resistances is connected at one side to the ground and through a series rectifier at its other side to one of 100 terminals denominated C00 . . . C99. Further each resistance is connected to two branch rectifiers which are strapped in groups of ten, in such a manner that through one of these rectifiers each group of ten combinations, denominated by the same first figure, is connected to one common point and through the second rectifier each group of ten resistances denominated by the same second figure is connected to a common point. The 20 common points, thus obtained, are connected to the 20 wires A0 . . . 9 and B0 . . . 9 referred to above.

The ground connected through each resistance attempts to bring the corresponding terminal C to ground potential, but so long as no signals are received from any of the registers, all of the terminals C are maintained at a relatively negative potential, because negative potential is connected from the cathodes of all triodes DT1 to the eight wires X1, X2, X4, X6, Y1, Y2, Y4 and Y6, and through the rectifier network, shown in Fig. 2, this negative potential is extended to all of wires A0 . . . 9 and B0 . . . 9 and further through the branch rectifiers of the 100 resistances also to the bottom-most part of these resistances. Every wire A0 . . . 9, B0 . . . 9 is connected via at least one rectifier to at least one lead X or Y.

In the example referred to above, in which a signal was sent from register No. 1 indicating combination No. 25, wires X2, Y1 and Y4 assume a relatively positive potential and the corresponding wires X'2, Y'1 and Y'4 assume a relatively negative potential, as already explained above. Under these conditions, wires A2 and B5 will now assume also a positive potential, because all of the four rectifiers through which each of them is extended to the cathode leads of tubes DT, according to Fig. 2, are blocked thus become non-conducting. At least one of the rectifiers connecting each of the other A and B wires to the DT tubes is not blocked, permitting a drop in potential across the associated 30,000 ohm resistance, so that all of the other A and B wires are negative.

Of the 100 leads to terminals C00 . . . C99 there is now one which is also able to assume a relatively positive potential, as a result of both of its branch rectifiers being connected to leads A and B respectively that are at a relatively positive potential. In the case in point, this is the lead to terminal C25, because this is the only one which through one of its branch rectifiers is connected to wire A2 and through the other branch rectifier to wire B5. All other terminals C will be maintained at a relatively negative potential, because one or other or both of their branch rectifiers will be connected at negative potential. The particular terminal C corresponding to the numerical indication which was given from register No. 1 will, therefore, turn positive, and, as this register will cause its signal to be transmitted only in time unit No. 1, terminal C25 will assume a positive potential only in this time unit No. 1, but will remain negative in all the other time units 2 to 100.

We now have 100 leads representing 100 digital combinations to any one of which a pulse may be connected in any one of 100 time positions each characteristic of a corresponding one of 100 register controllers.

Each of the terminals C is jumpered by means of a single jumper, which is common for all 100 registers served, to one of the terminals D1 . . . 33. These 33 terminals represent 33 different directional indications, into which any one of the 100 numerical combinations may be translated. These 33 terminals are connected through another explorer, of the type disclosed by U. S. Patent No. 2,563,589 to the grid circuit of an amplifying tube AT. This explorer is controlled by two groups of sources, the first comprising the 11 sources P*d*1 . . . 11 and the second the three sources P*e*1 . . . 3 the shape and timing of the pulses of which are also represented in Fig. 3 in relation to the sources P*a*, P*b* and P*c* employed at the explorer of the registers.

The manner in which these sources are employed to identify each of the 33 directional indications is shown by the table in Fig. 5.

Terminals D1 . . . 33 are normally held at a relatively negative potential by the fact that the terminals C00 . . . C99 to which they may be connected are normally relatively negative, as explained above.

When any one register signals a combination of two figures to the common translator, the corresponding terminal C will become positive at intervals in the time position characteristic of the register concerned and thus the terminal D connected thereto will also become positive at intervals, and will apply positive potential to the grid of tube AT in one of said repeated time positions in which this positive potential is not absorbed by one of the sources P*d* or P*e* controlling the corresponding terminal D. Taking again the case of the example given above, in which register No. 1 signals combination No. 25, terminal C25 will attempt to become positive in each first time unit of a group of 100. Assuming now that terminal C25 is connected to terminal D2 because it is required to give direction indication No. 2 for combination No. 25, then terminal D2 will not apply positive potential to the grid of AT in the first time unit of every group of 100, because it may be seen that in quite a number of cases either the source P*d*2 or the source P*e*2 or both of these sources may be at a relatively negative potential. As may be seen from the table in Fig. 5, these two sources are both at a relatively positive potential only in the second time unit of each group of 33 time units. Only when the first time unit of a group of 100 coincides with the second time unit of a group of 33 will all of the sources controlling the terminal D2 be such that this may turn positive.

Consideration of this point will show that by combining the functions of sources P*a*, P*b* and P*c*, which control a cycle of a 100 consecutive time units, with those of sources P*d* and P*e*, which control the cycle of 33 consecutive time units, a main cycle of $100\times33=3300$ time units is obtained and in only one time unit of such a cycle of 3300 are all conditions set for applying positive potential to the grid of tube AT via one of the terminals D as a result of a signal from one particular register.

In the example given, it may be calculated that this will happen in each time unit No. 101 of a cycle of 3300 time units, this being a time unit which is at the same time the first of a cycle of 100 time units and the second of a cycle of 33 time units. The table in Fig. 6 shows a number of these coincident time units for a restricted number of cases for each of 33 direction-indications for 35 registers, from which the remaining cases, not shown in the table, may be easily deduced. It will now be clear that for the example assumed only in time unit No. 101 in each cycle of 3300 time units, with the amplifying valve AT, which is connected as a cathode follower, supply a positive impulse from its cathode to a wire which is commoned to all 100 registers. In each register this wire is connected via a resistance of 100,000 ohms to a set of three rectifier gates which are connected for each register to the same combination of sources P*a*, P*b* and P*c*, which, in the upper part of the drawing, determine the time unit in which this register is able to send a signal to the common translator. Accordingly, all of the sources connected to the respective wire from valve AT will be relatively positive at the time this signal is sent, and only in this particular register may the grid circuit of the valve BT which is provided individually to each register, assume a relatively positive potential. In all other registers this grid circuit is maintained, in time unit No. 101 in the example given above, at a negative potential, because one or more of the sources P*a*, P*b* or P*c* connected at these registers would supply a relatively negative potential and thereby keep the grid circuit negative. The difference of potential existing between this grid circuit and the common lead from valve AT will for all such registers be absorbed in the 100,000 ohm resistance which is provided individually to each register.

In the example given, only valve BT of register No. 1 will receive an impulse in time unit No. 101, and this impulse is now retransmitted to two sets of cold cathode tubes TD1 . . . 11 and TE1 . . . 3 respectively. Each of these tubes is controlled by an impulse source in the manner disclosed in United States Patent No. 2,595,378, so that it is able to ionise when receiving an impulse from BT only if the controlling impulse source is at a relatively positive potential. For tubes TD1 . . . 11 one of each of eleven sources Rd1 . . . 11 have been employed, and for tubes TE1 . . . 3, one of each of three sources Re1 . . . 3 is used. These fourteen sources are, except for their amplitude, identical to the sources Pd1 . . . 11 and Pe1 . . . 3, represented in Fig. 3 and thus their pulses are exactly in synchronism with the pulses of these sources. The result is that when an impulse, as in the example given above, arrives in time unit No. 101, only tubes TD2 and TE2 are able to ionise, because this impulse arrives in the second time unit of a cycle of 33, in which, as may be seen from Fig. 5, only sources Rd2 and Re2 are relatively positive. The combination of tubes TD2 and TE2 ionising at register No. 1 now indicates to this register that combination No. 25 corresponds to direction No. 2 and, by means not illustrated, the register controls selection of an idle outlet in the wanted direction. Operation of tubes TD, TE also causes the register immediately to disconnect, by any known means, the ground to those of the eight leads, to which ground was connected via the contacts l1 of the operated recording relays for numerals A and B.

If several registers want a combination of figures to be translated simultaneously, each of these registers causes the terminal C corresponding to the combination to be translated to turn positive only in a particular time unit identifying this register, and accordingly only this particular register will receive the translated indication in a time unit which is determined both by the identified register and the direction required.

The operations for all different registers may, therefore, happen in a simultaneous manner, in such a sense that the signals indicating a combination of figures may be connected to the common translator for several registers simultaneously, but the translator will for each register use this information only at the appointed time, as determined by the identity of the register at one hand and the direction required at the other hand.

Assuming that the length of a time unit of the impulses employed is 0.2 ms., then it will be clear from the above that the total main cycle of 3300 time units will last 660 ms. This is the maximum time a register may have to wait before receiving the translated indication after having connected the required signals to the common translator. On the other hand, during a period of 660 ms. any number of other registers may have requested and obtained a translated indication. Actually it may be said that if all 100 registers would demand a translation at the same moment they would all be served during the next period of 660 ms.

It may occur that certain number combinations contain more or less than the two numerals assumed in the example represented by the drawing. Assuming, e. g. that instead of employing the 100 combinations 00 to 99, arrangements must be made for translating a single digit "0" and 90 combinations "10" to "99" into one of 33 different direction indications. In this case the arrangements at the registers will not be modified, but at the common translator the 10 resistances with their corresponding connections representing combinations "00" to "09" will be replaced by a single resistance representing combination "0." This resistance is the only one which is connected to wire Ao and on this account the branch rectifier inserted in the connected wire Ao may be omitted. Further the connections from this resistance to the ten wires B0 . . . 9 are also emitted, so that also this branch rectifier is suppressed for the resistance in question.

Wire Ao is connected in the manner shown in Fig. 2, and accordingly this wire will only become relatively positive when any one of the registers signals figure "0" as a first figure. Because resistance "0" is controlled by this wire alone and not by any of the wires B0 . . . 9, the connnection to terminal C. O will now become immediately relatively positive as soon as the register has connected the signal corresponding to the first figure "0" alone. This will again happen only in a time unit identifying the calling register and the translated information will be transmitted backwards to this register in a time unit depending on the direction indicated for first figure "0," as determined by the jumper from terminal C. O to one of terminals D1 . . . 33.

If, on the other hand, certain three-figure combinations have to be translated, a number of resistances and corresponding terminals "C" is provided in accordance with the number of three-figure combinations to be translated and each of these resistances will be provided with three branch rectifiers. The first two of these are connected exactly as indicated in Fig. 1, so that they are controlled by the first and second figure A and B respectively. The third branch rectifier is connected to a third set of ten wires, which each represent one of the third digital values and all equipment represented at the upper part of Fig. 1 would be increased to transmit the information for three figures, i. e. from each register there will be twelve wires, divided in three sets of four, indicating the three different figures to be translated. Accordingly, there will be twelve explorers instead of the eight described so far, and there will be twelve double triodes DT1, DT2 instead of the eight described so far, so that a total of 24 wires will be available from the cathodes of these double triodes, the third set indicating the third prefix figure being provided for connection to the third branch rectifiers, in the same manner as already explained for the first two, of those resistances representing three-figure combinations.

It should be clear, that a mixture of one-, two-, or three-digit combinations may be translated by connecting the resistances representing single-digit combinations only to one of the leads A0 . . . 9 as described above, by connecting the resistances representing two-digit combinations via two branch rectifiers to one each of leads A0 . . . 9 and by connecting those resistances representing three-figure combinations via three branch rectifiers to one each of all three sets of leads, as described above. In a similar manner yet further combinations comprising four or more numerals may be translated.

When the equipment is arranged in the way described above, the registers do not need to determine themselves which number of figures must be received before it is possible to obtain a translated indication. For each of the prefix figures received consecutively at a register, it will connect a combination of grounds on the corresponding sets of four wires, as soon as each digit is recorded, and when for any one combination the number of figures required for the translation is complete, the translator will provide the translated indication at the appointed time. So long as the number of figures required for translation has not been completely received, the translator is unable to react on the indications given for the partially received combination. This is due to the fact that, for each resistance representing a combination, a relatively positive potential should be provided to all of its branch rectifiers in order that the corresponding terminal C may turn positive, and this does not happen until all corresponding figures have been received, so that as many control wires as are required for each combination, have become relatively positive. This implies that the first two figures of a three-figure combination are not available as a two-figure combination, and so on.

It will be clear that, by means of the principles shown, it is possible to obtain a variety of different arrangements. For example, in case it should be required to provide for more than 33 different direction indications, this can be obtained either by increasing the number of sources provided to control the direction indications, or alternatively it is possible to use the same number of sources as shown on the drawing, but combined in a different manner. For example, with the number of sources as indicated in Fig. 2, it is possible to obtain 100 different direction indications, via a common translator for 33 registers. In this case, the sources controlling the explorers at the registers and the sources controlling the explorer at the common translator, are interchanged, so that a cycle of 33 time units is obtained in which 33 different registers may signal a combination of figures, whereas at the translator a cycle of 100 time units is obtained to signify 100 different classes of calls.

Fig. 7 shows a different method of signalling the code combination, to be translated, from a register controller to the common translator. The prefix digits to be translated may either be directly recorded in decimal form in the register, or may be recorded in binary or 1, 2, 4, 6 code on groups of four relays. In the latter case, contacts of each group of four relays R*a* . . . R*d* are connected up in tree formation to connect earth from front contact *l*1 of the locking relay L to any one of ten contacts 1 . . . 0. The contacts 1 . . . 0 would be directly selected if decimal storage means were used.

Ten leads per digit per register to the queueing network are now required; that is 2×10×100 leads for 100 registers; and the network connects the two thousand leads from one hundred registers to two sets of ten tubes DT which mark the terminals A0 . . . 9. B0 . . . 9 direct.

In Fig. 1, each receiving valve DT1 is associated with a phase inverting valve DT2 which normally applies relatively positive potential to the X′ or Y′ control wire, but removes it as the receiving valve DT1 applies positive potential to the X or Y control wire.

This arrangement is liable to improvement in two respects. The fact that the absence of a pulse is used as a means to signal the non-operated condition of the corresponding storing relay opens the way for faulty operation in case the absence of a pulse is due to some irregularity such as bad contact or an interruption in one of the explorer circuits. The use of phase inverting circuits in D. C. amplification requires careful adjustment and stabilisation of supply voltages.

In the arrangement, according to Fig. 7, these drawbacks have been avoided. Here decoding is performed in the register circuit using contacts on each set of storing relays R*a*/R*d* connected in tree formation. At the receipt of a code, the combination of contacts prepares a circuit from a positive potential source towards one out of 10 terminals 1 . . . 0. In this case, if any of the contacts were bad, none of these 10 terminals would be energised. In this arrangement, the translator must be equipped with 10 explorer circuits per digit, each terminating in a receiving valve, one such explorer circuit with associated valve being provided for each of the 10 terminals of the contact tree. On the other hand, no phase inverting tubes and decoder networks are necessary, as there is no decoding in the translator.

It is possible to reduce the number of explorer circuits per digit, without losing the advantages of the latter arrangement, by adopting an arrangement according to Fig. 8. In this arrangement, the decoding is again performed in the translator circuit, but there is no need of phase splitting, this being performed by the use of change-over contacts on the storing relays at the register. The translator is equipped with four pairs of explorer circuits per digit, one pair being provided for each code element. One explorer, which is denoted by "O′" of this pair, may be used to signal operated condition of the associated storing relay, whereas the other "R′" will carry a positive pulse if the storing relay has remained unoperated. The grids of receiving valves DT1, DT2 in which the two explorers of each pair terminate are respectively connected directly to the O′ and R′ wires of the corresponding pair of control wires in the decoding network, there being no need of phase inverting valves.

In this arrangement bad contacts at any storing relay would result in a pulse being sent neither on the (+) nor on the (—) explorer, and the decoder would not operate at all.

A further reduction of the number of explorers required per digit is obtained in the arrangement according to Fig. 9. In this arrangement the decoding is partially performed at the register, partially at the translator.

In the register three of the storing relays R*b*/R*d* carry contacts connected up in tree formation, to select any one out of 5 terminals, which are denoted by 0/1, 2/3, 4/5, 6/7, 8/9, respectively. The translator is equipped with a group of 5 explorers per digit, one for each of the 5 terminals mentioned. On top of this, a pair of explorers is provided per digit, to signal the operated or unoperated condition of the fourth storing relay R*a*.

A code is transmitted in the form of a pulse on one explorer out of the group of 5, and another pulse on one explorer of the pair. The decoder network in the translator comprises a group of 5 control wires A0/1 . . . A8/9 and a pair of control wires A*un*—A*p*. Each wire of the group of 5 is able to select one out of 5 pairs of codes, comprising one odd and one even code. The wires of the pair of control wires decides between odd and even.

In this way it is possible to reduce the number of explorer circuits with their associated valves to 7 and still obtain the advantage that no failures may result from bad contacts or other faults, owing to which a positive potential on any of the control wires might be suppressed.

Instead of translating each digital combination into a single route indication, it could be translated, it could be translated for a switching system having such arrangement into a chamber of routing digits by cross-connecting the terminals C respectively to a constant or variable number of terminals D one from each of a group of terminals. Each group of terminals would correspond to a digital order in say the decimal system of notation, and the pulse cycle P*d*1 . . . 11, for instance, would be used for queueing potentials on the different leads of a group on the common grid lead of its tube AT, Fig. 1.

The tube AT for each digital order: units, tens, hundreds . . .; would be connected by an explorer circuit, a valve BT and a register circuit including tubes T*d*1 . . . 11 and relays D*a*/D*k* only.

Contacts of each group of relays D*a*/D*k* would then be used to control the selection at successive switching stages.

Alternatively, a plurality of thirty-three point groups of terminals D with corresponding tubes AT, explorers, and cold cathode tube and relay registers, could be used.

Any other combination of pulse cycles could be used to characterize registers and routes respectively providing that the same prime number is not used in both combinations.

Again, if it was desired to translate for a single register-controller at a time, the explorer circuits and tube DT1, DT2, Fig. 1, could be replaced by a switching device, e. g. a uniselector having nine or more banks, arranged to be set in turn to different register controllers requiring translation. The nine banks would carry the eight digital code indications to the translator and the return lead or leads from tube or tubes AT. In this case time-pulse signalling would only be used for signalling the route from the translator to the register-controller.

While the principles of the invention have been described above in connection with specific embodiments, and particular modifications thereof, it is to be clearly understood that this description is made only by way of example and not as a limitation on the scope of the invention.

What I claim is:

1. In a translation system, a plurality of information storage equipments arranged in groups, a first group of conductors common to all said storage equipments, means connecting said storage equipments of each group respectively to the conductors of said first group, means connected to said connecting means for selectively energizing a combination of the conductors of said first group at a predetermined repetitive time position in a repetitive cycle of time positions when a combination of storage equipments in a group is set and according to the setting of said storage equipments, said predetermined time position being peculiar to said group of storage equipments, a second group of conductors, there being one for each combination of first conductors energized, and translation means connected between said first and second groups of conductors and controlled by the energized combination of conductors of said first group for energizing a conductor of said second group.

2. A translation system, as claimed in claim 1, in which the translation means comprises a rectifier network connecting the first and second groups of conductors.

3. A translation system, as claimed in claim 2, further comprising means connected between each of the second conductors and all the storage equipments for signalling the translated information back from the second group of conductors to the information storage equipment which originated the translation.

4. A translation system, as claimed in claim 3, in which the means for signalling back the translated information comprises means connected to the conductors of the second group for transmitting the information during a selected one of the predetermined repetitive time positions peculiar to the group of storage equipments which originated the translation, said selected time position being determined by the conductor of the second group which is energized.

5. Electrical translating equipment, as claimed in claim 4, in which the translation means includes means to receive information and to translate within one repetitive cycle of time positions and to signal back translated information in another cycle of time positions, and in which the number of time positions in the one cycle has as its factors no prime number which is a factor of the number of time positions in the other cycle.

6. Electrical translating equipment, as claimed in claim 1, in which the means for energizing a combination of conductors of the first group comprises a number of static electronic explorer circuits, said circuits including means for allocating to each group of the storage equipment a different time position in a repetitive cycle of time positions.

7. Electrical information storage and translating equipment comprising a plurality of information storage equipments arranged in groups and a translating equipment associated in common with said storage equipments, a first group of static electronic explorer circuits including means for allocating to each one of said groups of storage equipments a time position in a first repetitive cycle of time positions, which position is different for each group of storage equipments, for signalling stored information to be translated to said common translating equipment, a common cross-connecting field in said translating equipment for translation purposes, at least one second static electrical explorer circuit including means for allocating a time position in a second repetitive cycle of time positions to said translation equipment for each translation to be transmitted back to said storage equipment, interconnections between said first group of explorer circuits and said cross-connecting field, interconnections between said cross-connecting field and said second explorer circuits, detecting means in each storage equipment interconnected with said second explorer circuits to detect signals in its own time position in said first cycle, and registering means associated with each group of storage equipments for detecting the time position of a signal in said second cycle and registering the message characterised thereby.

8. Electrical signalling equipment which comprises a single first electrical circuit, a plurality of second electrical circuits, a single signal channel to which all of said circuits are connected, means at said first electrical circuit for signalling from said first electrical circuit to any one of said second electrical circuits, means for generating signals each of which comprises an electrical potential pulse occupying a single time position in a repetitive cycle of time positions, said cycle having at least $mn$ time positions, where $m$ is the number of said second electrical circuits and $n$ is the number of items of information which have to be catered for, means at said first electrical circuit for causing an electrical potential pulse generated by said signal generating means in that one of $n$ time positions allocated to the second electrical circuit to which signalling is to occur and which characterises the item of information to be sent to operate said signalling means to transmit said pulse, the position of said pulse in said cycle characterising both the identity of the second electrical circuit for which it is intended and the item of information to be sent, a receiving device at each second electrical circuit which only responds to pulses received in the $n$ time positions allocated to that second electrical circuit, and recording means at each second electrical circuit under control of said receiving device for recording the identity of that one of the $n$ time positions in which said receiving device responds to a received pulse.

9. Equipment, as claimed in claim 8, and in which the generating means generates two secondary cycles of time positions, one of which has $m$ time positions and the other of which has $n$ time positions, which secondary cycles together form the cycle of $mn$ time positions.

10. Equipment, as claimed in claim 9, and in which the generating means operates each of the secondary cycles by generating a plurality of tertiary cycles, the number of time positions in the sets of tertiary cycles being so chosen as to have no prime number factors common to more than one number.

11. Equipment, as claimed in claim 10, and in which the pulse-generating means comprises static electrical scanning means having $n$ input terminals, one per item of information catered for, and a single output terminal, means for applying pulses to said scanning means so that said input terminals are connected to said output terminal in successive time positions of the secondary cycle having $n$ time positions, and means for connecting a pulse to the input terminal characterising the signal to be sent, said pulse occupying a time position in the secondary cycle with $m$ time positions which identifies the second electrical circuit to which that signal is to be sent.

12. Equipment, as claimed in claim 11, and in which the signalling means comprises a cathode follower valve to the control grid of which the output terminal of said scanning device is connected, and a biasing connection to said control grid which maintains said valve cutoff in the absence of a pulse from said scanning device, the output of said cathode follower valve being connected to the signal channel.

13. Equipment, as claimed in claim 9, and in which the receiving means comprises an electrical gate circuit controlled by pulses in such a way that it will only give an output in response to a pulse in one of the $n$ positions in the cycle allocated to that second electrical circuit.

References Cited in the file of this patent

UNITED STATES PATENTS

| | | |
|---|---|---|
| 2,136,441 | Karolus | Nov. 15, 1938 |
| 2,291,964 | Holcomb | Aug. 4, 1942 |
| 2,387,018 | Hartley | Oct. 16, 1945 |

(Other references on following page)

UNITED STATES PATENTS

| | | |
|---|---|---|
| 2,506,613 | Ransom | May 9, 1950 |
| 2,561,051 | Den Hertog | July 17, 1951 |
| 2,563,589 | Den Hertog | Aug. 7, 1951 |
| 2,564,403 | May | Aug. 14, 1951 |
| 2,583,711 | Scowen | Jan. 29, 1952 |
| 2,590,950 | Eckert | Apr. 1, 1952 |

| | | |
|---|---|---|
| 2,595,378 | Den Hertog | May 6, 1952 |
| 2,686,224 | Hartley et al. | Aug. 10, 1954 |
| 2,708,220 | Levy | May 10, 1955 |

OTHER REFERENCES

"Digital Computer Switching Circuits," September 1948, "Electronics," pp. 110–116, 118.